United States Patent [19]
Park et al.

[11] Patent Number: 6,039,248
[45] Date of Patent: Mar. 21, 2000

[54] METHOD FOR PREPARING SAFE ELECTRONIC NOTARIZED DOCUMENTS IN ELECTRONIC COMMERCE

[75] Inventors: Chang Soon Park; Tae Geun Kim; Sung Woo Tak, all of Daejeon, Rep. of Korea

[73] Assignee: Electronics and Telecommunications Research Institute, Daejeon, Rep. of Korea

[21] Appl. No.: 09/006,904

[22] Filed: Jan. 14, 1998

[30] Foreign Application Priority Data

Oct. 27, 1997 [KR] Rep. of Korea ............... 97-55208

[51] Int. Cl.[7] .................. G06F 17/60; H04K 1/00
[52] U.S. Cl. .............. 235/379; 340/825.34; 380/23
[58] Field of Search ............ 235/379; 340/825.34; 380/23; 705/35

[56] References Cited

U.S. PATENT DOCUMENTS 5,475,758 12/1995 Kikuchi ................................ 380/25
5,659,616 8/1997 Sudia .................................. 380/23
5,671,279 9/1997 Elgamal ............................... 380/23

*Primary Examiner*—Donald Hajec
*Assistant Examiner*—Jamara A Franklin
*Attorney, Agent, or Firm*—Antonelli, Terry, Stout & Kraus, LLP

[57] ABSTRACT

The present invention relates to a method for preparing safe electronic notarized documents in electronic commerce which provide a safe notarization for a transaction between a customer and a merchant. The method includes steps of a notarizing organization transmitting an electronic notarized document with a digital signature to a customer/merchant, the customer/merchant decoding the electronic notarized document and transmitting the electronic notarized document with digital signature to the notarizing organization, the notarizing organization decoding the electronic notarized document and comparing the decoded electronic notarized document with the electronic notarized document without any digital signatures so as to obtain a message digest of the notarized document and to send the electronic notarized document with digital signature to the customer/merchant, and the customer/merchant storing the electronic notarized document.

3 Claims, 7 Drawing Sheets

METHOD FOR PREPARING SAFE ELECTRONIC NOTARIZED DOCUMENTS IN ELECTRONIC COMMERCE

BACKGROUND OF THE INVENTION

1. Field of the Invention

The present invention relates to a method for preparing safe electronic notarized documents in electronic commerce. Particularly, the present invention relates to a method for preparing safe electronic notarized documents in electronic commerce, in which in the case where a remote transaction is carried out through an on-line system between a customer and a merchant, when preparing an electronic notarized document for proving the realization of the transaction, an encrypted safe notarized document is formed so as to prevent a forgery of the document.

2. Description of the Prior Art

As a security technique which is provided in the electronic commerce at present, there is an X509-based certificate which attests as to whether the merchant and the customer have respectively proper qualifications. However, the certificate which proves only the reliabilities of the merchant and customer cannot provide an authenticity proving for the details of the on-line transaction between the merchant and customer.

FIG. 1 illustrates the constitution of the conventional electronic transactions using the certificate technique. The conventional electronic transactions will be described referring to FIG. 1.

Referring to FIG. 1, the conventional electronic transaction system includes: a merchant 20 for selling commodities through electronic transactions; a customer 10 for buying commodities; a card acquirer 40 for handling the buying slips to be used by the customer 10; a card issuer 50 for issuing the cards; a certifying organization 30 for attesting the reliabilities of the merchant 20, the customer 10 and the card acquirer 40.

An electronic transaction starts first by requesting (101) for a communication connection and an exchange of the reliability certificates from the customer 10 to the merchant 20. Then the customer 10 requests for reference (102) for the reliability certificate of the merchant 20 to the certifying organization 30, while the merchant 20 requests for a reference (103) for the reliability certificate of the customer 10 to the certifying organization 30. Then the certifying organization makes references to the reliability certificates, and notifies the results of the references to the customer 10 and the merchant 20 (104, 105).

Thus when the certifications for the customer 10 and the merchant 20 are completed, a mutual transaction is realized. That is, the customer 10 inspects the commodity information of the merchant 20, and selects (106) a commodity. Then the customer 10 notifies (107) to buy the selected commodity to the merchant. The merchant 20 request (108) for payment for the commodity to the customer 10.

Then the customer 10 furnishes (109) his (or her) own payment information to the merchant 20. The payment information includes the payment method (the kind of the card) and the card number. Based on the payment information of the customer 10, the merchant 20 requests (110) for a payment for the commodity bought by the customer 10 to the card acquirer 40. Then the card acquirer 40 requests (111) for a reference to the reliability certificates of the customer 10 and the merchant 20 to the certifying organization 30. When the reference results are received (112) from the certifying organization 30, the card acquirer 40 requests (113) for a payment to the card issuer 50.

In accordance with the request (113) of the card acquirer 40, the card issuer 50 executes (114) the payment. Then the card acquirer 40 sends the card certificate 115 to the merchant 20. Then the merchant 20 sends (116) the selected commodity and a receipt to the customer 10. The card issuer 50 issues a debit note for the payment to the card acquirer 40 so as to request (117) a payment to the customer 10. Then the customer 10 pays (118) based on the debit note to the card issuer 50.

However, in the above described conventional electronic transactions, a notarization cannot be provided, and therefore, if there occurs a dispute between the customer and the merchant, there can be no solution.

SUMMARY OF THE INVENTION

The present invention is intended to overcome the above described disadvantages of the conventional technique.

Therefore it is an object of the present invention to provide a method for preparing a safe electronic notarized document, in which an encrypting technique using an open key encrypting method, a message digest technique and an X509-based certificate simultaneously is utilized, so that a safe notarization can be provided to a transaction between a customer and a merchant.

In achieving the above object, the method for preparing safe electronic notarized document in electronic commerce according to the present invention includes the steps of: preparing a primary electronic notarized document based on a transaction detail information, a customer certificate, a merchant certificate, a notarizing organization certificate, and a certifying organization certificate by a notarizing organization, putting a digital signature to the primary notarized document by using a private key of the notarizing organization so as to form a secondary electronic notarized document, and transmitting the secondary electronic notarized document to a customer or a merchant (first step); decoding the secondary electronic notarized document of the first step by the customer or merchant by using a private key of the notarizing organization (second step); putting a digital signature on the decoded secondary electronic notarized document of the second step by the customer or merchant by using a private key of his or her own so as to form a tertiary electronic notarized document, and transmitting the tertiary electronic notarized document to the notarizing organization (third step); decoding the tertiary electronic notarized document of the third step by using an open key of the notarizing organization and an open key of the customer or merchant so as to form a biquadratic electronic notarized document, and comparing the biquadratic electronic notarized document with the primary electronic notarized document of the first step (fourth step); obtaining a message digest of the notarized document upon finding a correspondence between the electronic notarized document of the first step and the electronic notarized document of the fourth step, and putting a digital signature on the message digest by using a private key of the notarizing organization (fifth step); forming a final electronic notarized document for proving a realization of notarization of the transaction by utilizing the digitally signed tertiary electronic notarized document of the third step and the digitally signed message digest of the fifth step, and sending the final electronic notarized document to the customer or merchant (sixth step); and storing the final electronic notarized document of the sixth step by the customer or merchant after receipt of it from the notarizing organization (seventh step).

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

The method for forming an electronic notarized document according to the present invention will be described referring to the attached drawings.

Figure 1:
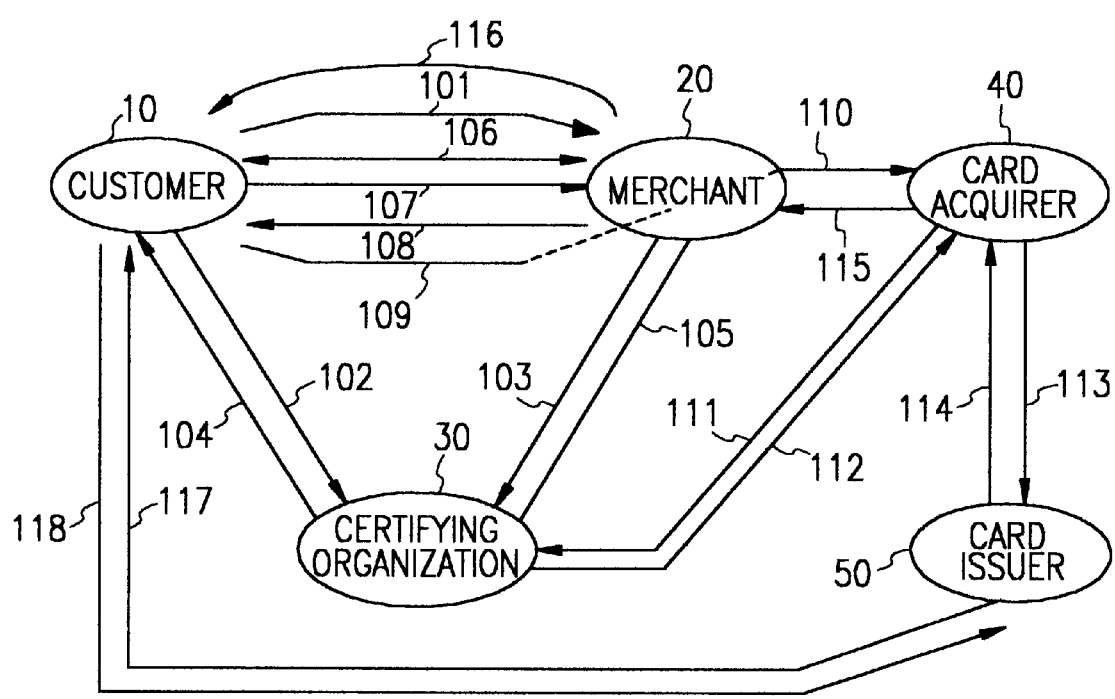
FIG. 1 illustrates the constitution of the conventional electronic transactions using the certification technique.
Figure 2:
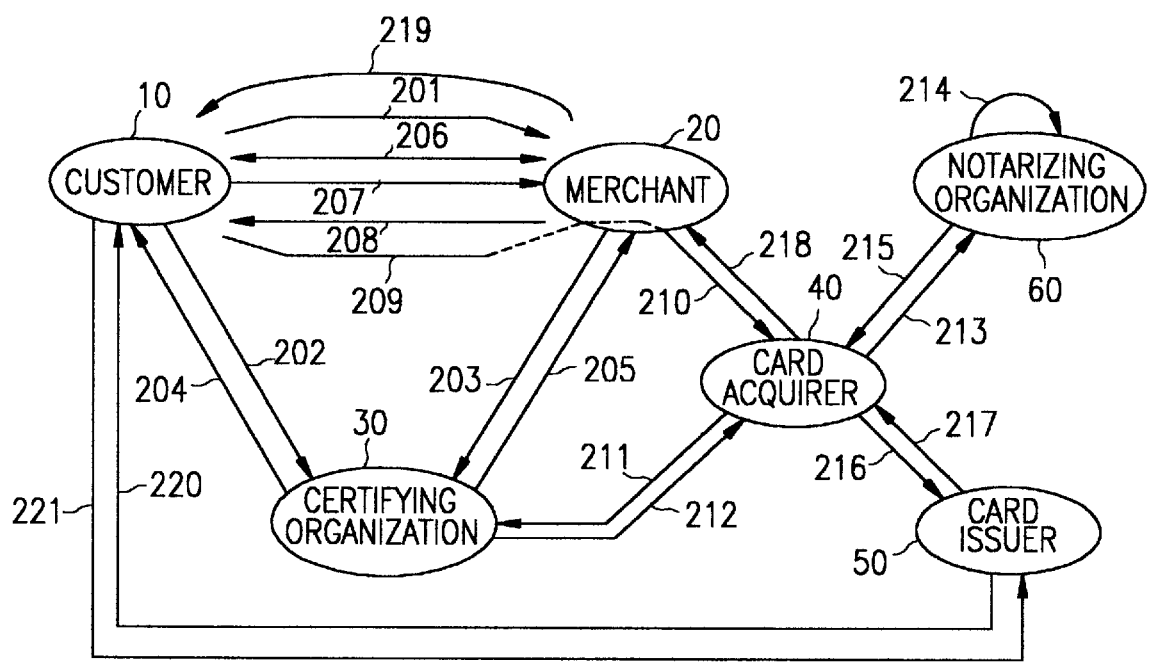
FIG. 2 illustrates the constitution of the electronic transactions using the certification technique according to the present invention.
Figure 3:
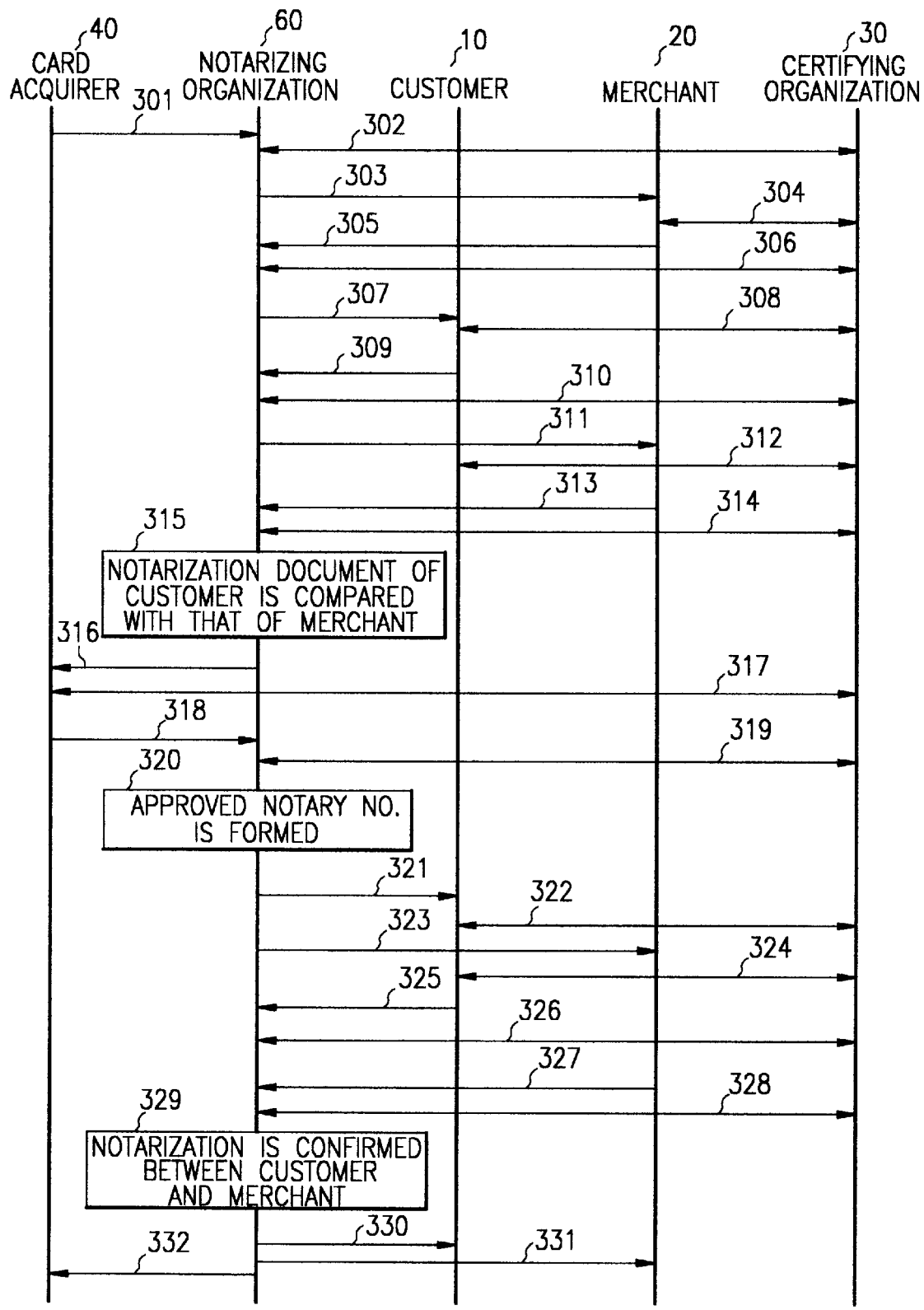
FIG. 3 is a flow chart showing the constitution of the notarizing procedure during the electronic transaction according to the present invention.
Figure 4:
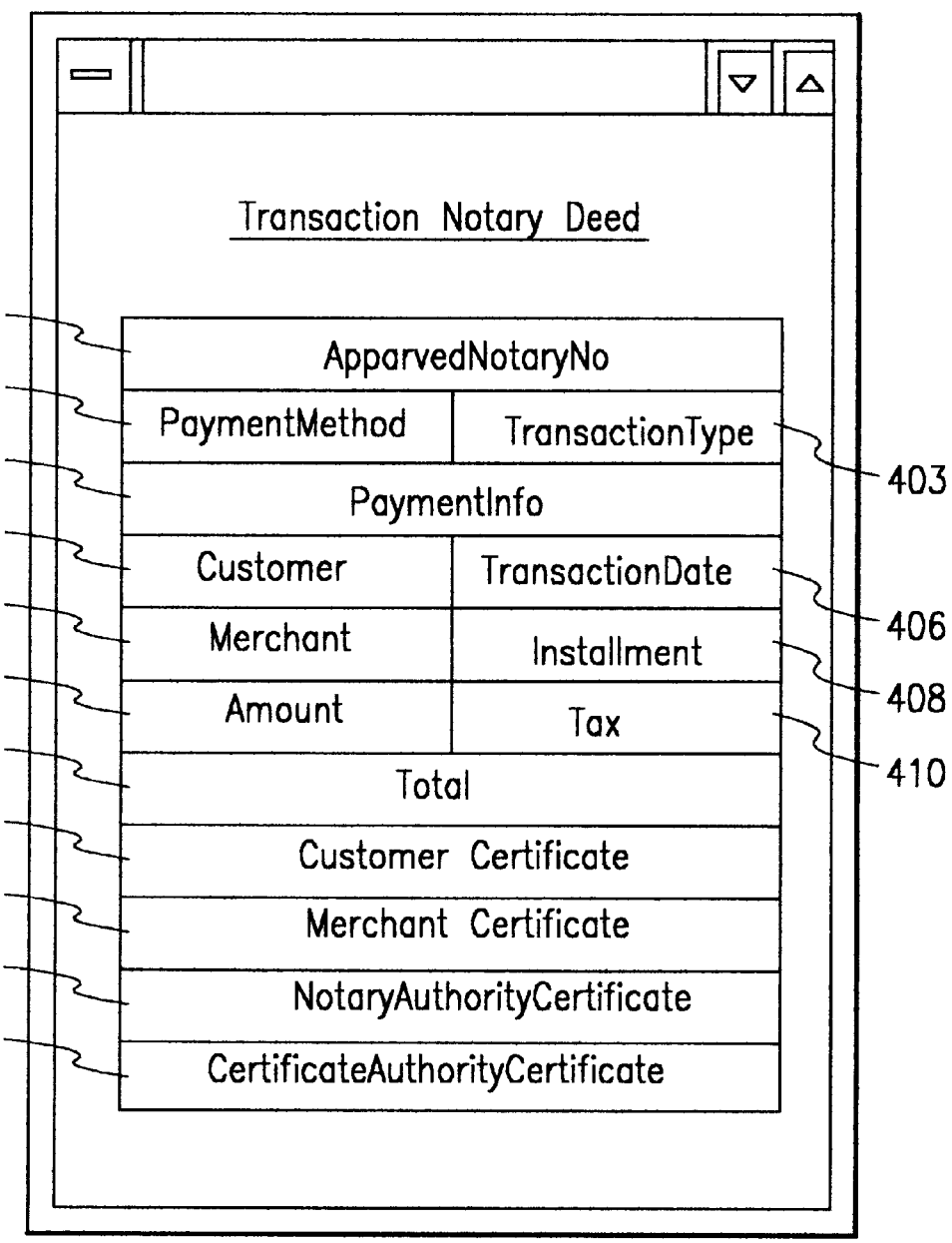
FIG. 4 illustrates the constitution of the electronic notarized document according to the present invention.
Figure 5:
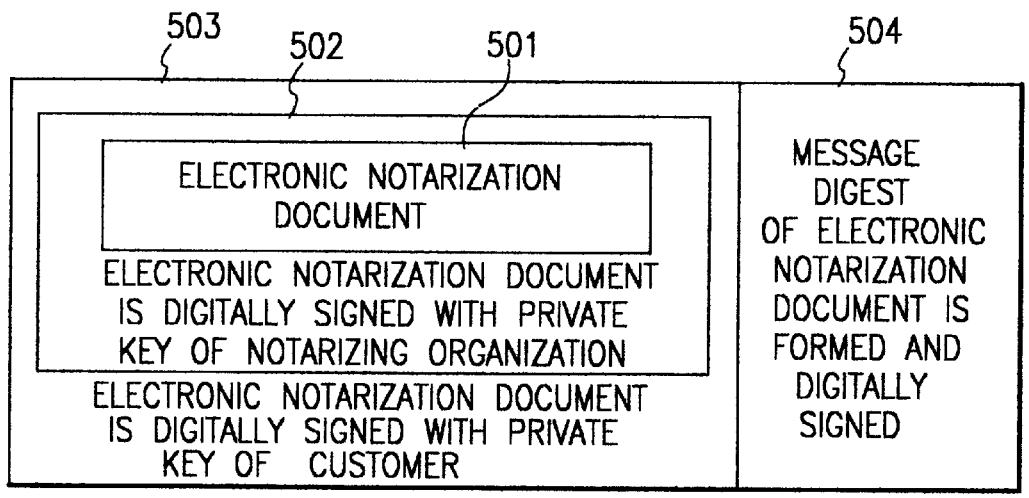
FIG. 5 illustrates the constitution of the electronic notarized document encrypted between the notarizing organization and the customer according to the present invention.
Figure 6:
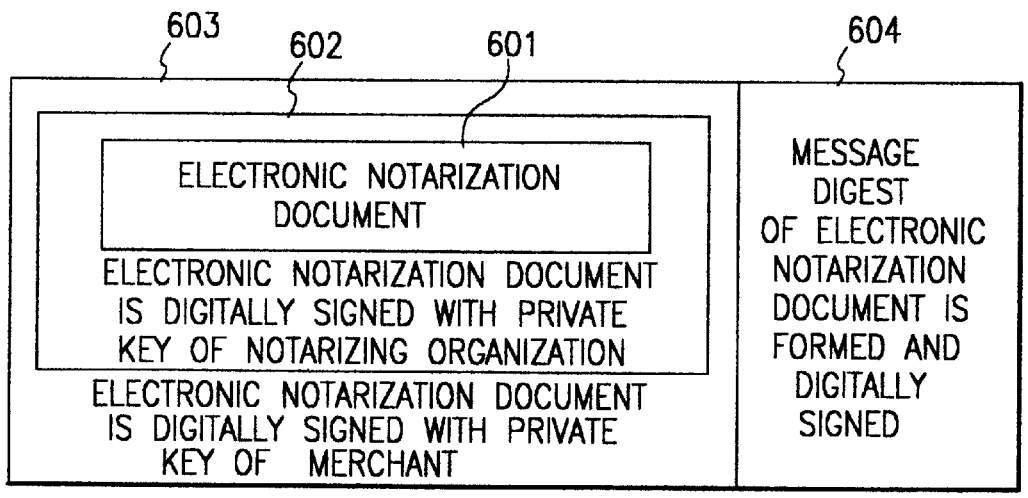
FIG. 6 illustrates the constitution of the electronic notarized document encrypted between the notarizing organization and the merchant according to the present invention.
Figure 7:
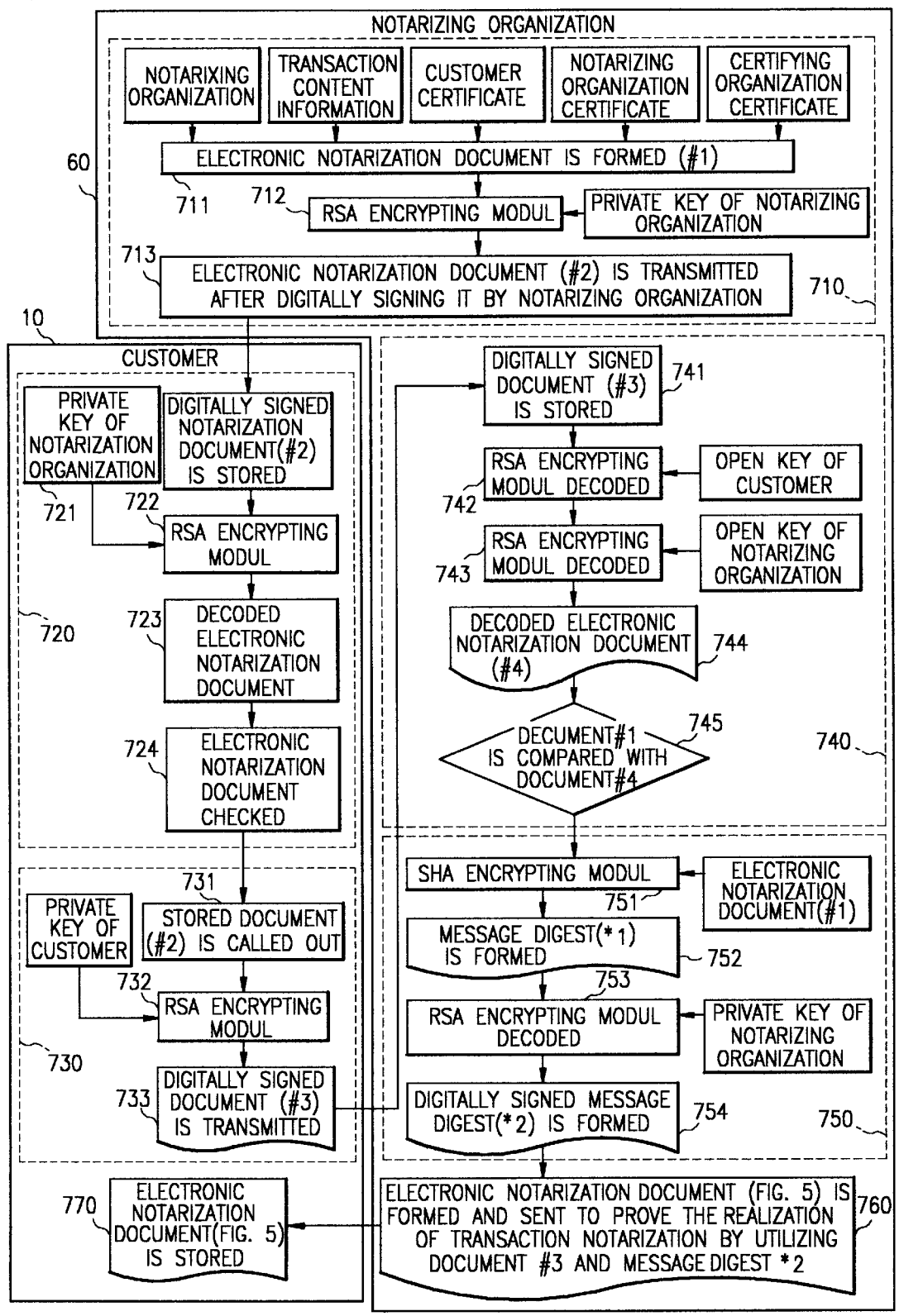
FIG. 7 is a flow chart showing the method for forming an electronic notarized document encrypted between the notarizing organization and the customer according to the present invention.
Figure 8:
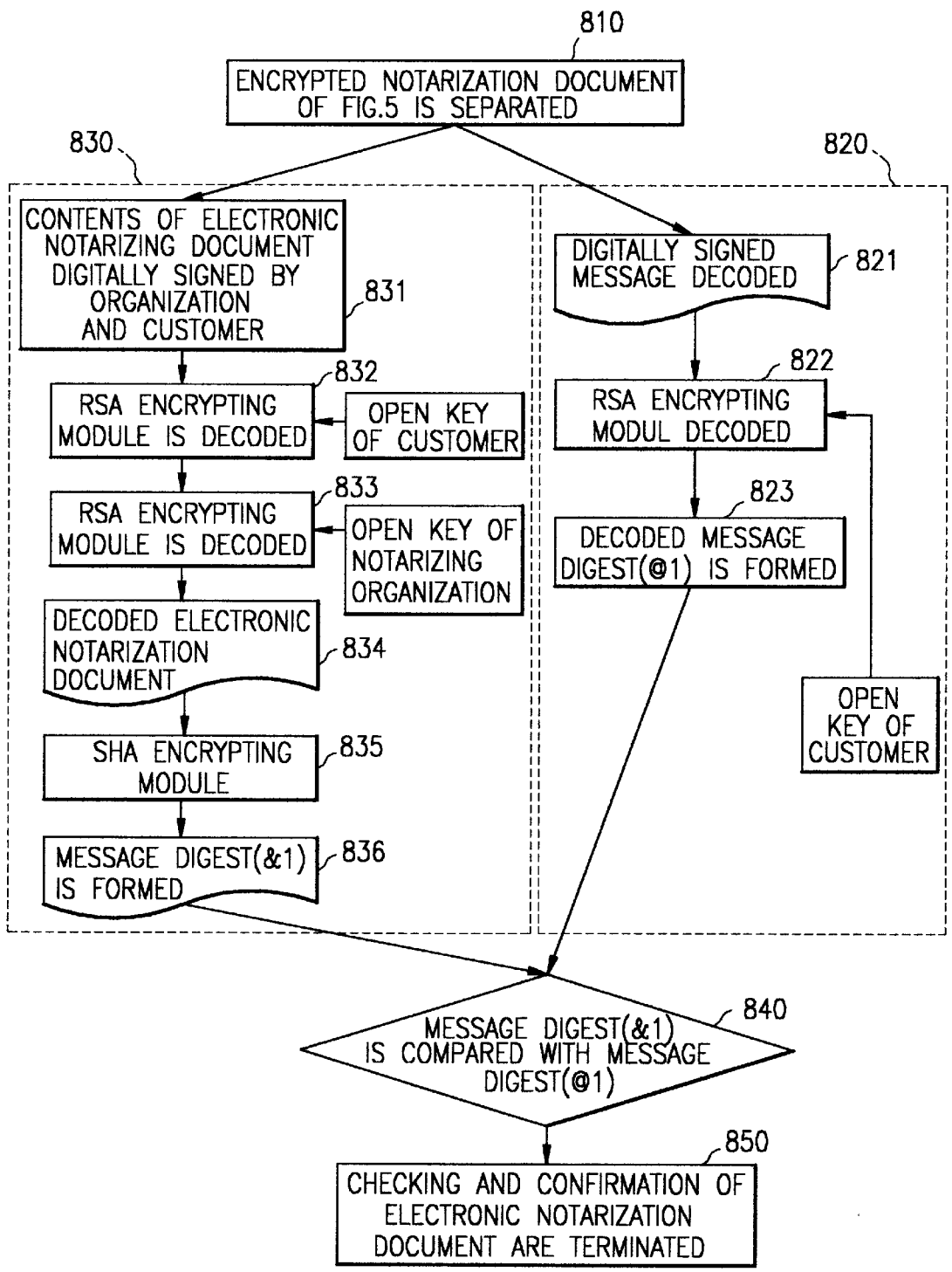
FIG. 8 is a flow chart showing the method for checking the encrypted electronic notarized document according to the present invention.

FIG. 2 illustrates the constitution of the electronic transactions using the certification technique according to the present invention. FIG. 3 is a flow chart showing the constitution of the notarizing procedure during the electronic transaction according to the present invention. FIG. 4 illustrates the constitution of the electronic notarized document according to the present invention. FIG. 5 illustrates the constitution of the electronic notarized document encrypted between the notarizing organization and the customer according to the present invention. FIG. 6 illustrates the constitution of the electronic notarized document encrypted between the notarizing organization and the merchant according to the present invention. FIG. 7 is a flow chart showing the method for forming an electronic notarized document encrypted between the notarizing organization and the customer according to the present invention. FIG. 8 is a flow chart showing the method for checking the encrypted electronic notarized document according to the present invention.

Referring to FIG. 2, the constitution of the electronic transaction using a certifying technique and a notarizing technique according to the present invention is as follows.

The constituents for an electronic transaction include: a merchant 20 for selling commodities through electronic transactions; a customer 10 for buying commodities; a card acquirer 40 for buying the buying slips of the customer 10; a card issuer 50 for issuing cards; a certifying organization 30 for certifying reliabilities of the customer 10, the merchant 20 and the card acquirer 40; and a notarizing organization 60 for notarizing the transaction documents formed between the customer 10 and the merchant 20 upon request by the card acquirer 40. An electronic transaction is realized when the customer 10 requests (201) for a communication connection and an exchange of the certifications to the merchant 20.

When a communication connection is formed between the customer 10 and the merchant 20, the customer 10 requests for a reference (202) to the certificate of the merchant 20 to the certifying organization 30, while the merchant 20 requests for a reference (203) to the certificate of the customer 10 to the certifying organization 30. Upon receipt of the request, the certifying organization 30 executes references in accordance with the requests, and notifies the results of the references to the customer 10 and the merchant 20 (204, 205).

When the certifications for both the customer 10 and the merchant 20 are completed, an electronic transaction is realized. The customer 10 inspects the commodity information of the merchant 20, and selects a desired commodity (206). Then the customer 10 notifies to the merchant 20 that he or she has decided to buy the commodity (207), and then, the merchant 20 requests (208) for a payment for the commodity to the customer 10.

Then the customer 10 furnishes his or her own payment information to the merchant 20. The payment information includes the payment method, the kind of credit card and the credit card number. Based on the payment information, the merchant 20 requests (210) for a payment handling for the customer 10 to the card acquirer 40. Upon receipt of the request, the card acquirer 40 requests (211) for references for the certificate of the customer 10 and the merchant 20. When the reference results are received (212) from the certifying organization 30, a notarization is requested for the transaction between the customer 10 and the merchant 20 to the notarizing organization 60. In accordance with the request, the notarizing organization 60 notarizes the transaction and transmits a transaction notarization completion signal to the card acquirer 40 (215).

Then the card acquirer 40 requests for a payment for the commodity bought by the customer 10 to the card issuer 50 (216). Then in accordance with the payment request by the card acquirer 40, the card issuer 50 executes the payment (217), while the card acquirer 40 sends the payment permission to the merchant 20 (218).

Then the merchant 20 sends the relevant commodity and a receipt to the customer (219), while the card issuer 50 sends a debit note to the customer 10 for a payment as much as the amount which has been paid to the card acquirer 40 (220). Then based on the debit note, the customer 10 executes a payment to the card issuer 50 (221), thereby terminating an electronic transaction.

During the transaction using the safe transaction notarizing technique, the notarization is executed when the card acquirer requests for a transaction notarization to the notarizing organization after receipt of the request for a payment from the merchant. The reason why the card acquirer requests for the notarization is that the right or the responsibility for the payment for the customer is held by the card acquirer which is directly connected to the card issuer.

FIG. 3 is a flow chart showing the constitution of the notarizing procedure during the electronic transaction according to the present invention. Here, the notarizing procedure of the notarizing organization 60 is illustrated.

Referring to FIG. 3, there are required the customer 10, the merchant 20, the certifying organization 30 and the card acquirer 40, besides the notarizing organization 60. First, a notarization is requested to the notarizing organization 60 by the card acquirer 40 on the transaction between the customer 10 and the merchant 20 (301). Thus the notarization is initiated.

Under this condition, when carrying out the procedure, the customer 10, the merchant 20, the card acquirer 40 and the notarizing organization 60 have to do a task repeatedly. This is the task of the steps 302, 304, 306, 308, 310, 312, 314, 317, 319, 322, 324, 326 and 328, at which the certificate is sent to the certifying organization 30 to make a reference each time when a message is transmitted. In the following descriptions on the notarizing procedure, the steps 302, 304, 306, 308, 310, 312, 314, 317, 319, 322, 324, 326 and 328 for making reference to the certificate will be skipped.

Upon receipt of a notarization request from the card acquirer 40 (301), the notarizing organization 60 requests to the merchant 20 for a buying information of the customer 10 (303), while the merchant 20 furnishes the buying information of the customer 10 to the notarizing organization 60 (305).

Upon receipt of the buying information from the merchant 20, the notarizing organization 60 forms a notarization document based on the buying information and the payment information received from the card acquirer 40. Then the notarizing organization puts a signature by using the private key of its own, and sends the digitally signed notarization document to the customer 10 and the merchant 20 (307 and 311). Thus the notarization document is displayed on the screens of the customer and the merchant as shown in FIG. 4. Under this condition, in the case of the merchant, the transmitted information should be such that the organization for operating the shopping malls of the merchant can handle it.

Referring to FIG. 4, the electronic notarization document according to the present invention includes: an approved notary number field 401 for storing an approved notary number assigned by the notarizing organization after the approval of the transaction between the customer and the merchant; a payment method field 402 for storing the payment method selected by the customer; a transaction type field 403 for expressing the kind of the transaction between the customer and the merchant; a payment information field 404 for storing the payment method information based on characteristics of the payment method; a customer information field 405 for storing the name of the customer; a transaction data field 406 for storing a data and time of the transaction between the customer and the merchant; a merchant information field 407 for storing the name of a shopping mall of the merchant; an installment information field 408 for expressing an installment information if the customer requested for an installment payment; an amount information field 409 for storing the price of the commodity selected by the customer; a tax information field 410 for expressing a tax for the commodity selected by the customer; a total amount field 411 for expressing a total amount for the commodity consisting of the amount of the amount information field and the tax of the tax information field; a customer certificate field 412 for storing the certificate of the customer; the merchant certificate field 413 for storing the certificate of the merchant; a notary authority certificate field 414 for storing the certificate of the notarizing organization; and a certifying authority certificate field 415 for storing the certificate of the certifying organization.

However, in the approved notary number field 401 which expresses the realization of the transaction, there is stored no value. This approved notary number is assigned by the notarizing organization. First, if notarization documents on which both the customer and the merchant have digitally signed are sent to the notarizing organization, then the notarizing organization compares the two documents with each other. If the details of the two documents are identical, then the identicality of the two documents is notified to the card acquirer, and a confirmation is received from the card acquirer. Then the approved notary number is assigned.

Referring to FIG. 3, after receipt of an electronic notarization document as shown in FIG. 4 (307), the customer 10 confirms the commodity information and the price of the commodity of its own selection. If its own buying information is same as the payment information, then the customer puts a signature on the electronic notarization document by using the private key of its own. Then this digitally signed notarization document is sent to the notarizing organization 60 (309). Meanwhile, after receipt of an electronic notarization document like the customer (311), the merchant 20 compares the buying information of the customer with the already forwarded information. If there is no deviation, the merchant puts a signature on the electronic notarization document by using the private key of its own, and sends the digitally signed notarization document to the notarizing organization (313).

Then, after receipt of the notarization documents from both the customer 10 and the merchant 20, the notarizing organization 60 sends the certificate of the customer 10 and the merchant 20 to the certifying organization to make a reference and confirmation (310 and 314). Then the electronic notarization documents of the customer 10 and the merchant 20 are decoded by using the open key of the certifying organization. Then the two documents are compared with each other (315), and if the two data values are identical, then the identicality is notified to the card acquirer 40 (316). Then the card acquirer 40 checks as to the payment ability of the customer 10 through the card issuer, and sends a payment certifying message to the notarizing organization 60 (317).

After receipt of the payment certifying message, the notarizing organization 60 assigns an approved notary number (320), and digitally signs the electronic notarization document. This digitally signed notarization document is sent again to the customer 10 and the merchant 20 (321 and 323). Then confirmation messages from the customer 10 and the merchant 20 are waited for.

Finally, the notarizing organization 60 receives the digitally signed notarization documents from both the customer 10 and the merchant 20 (325 and 327). Then the two notarization documents are confirmed (329), and if the two notarization documents are identical, it is notified to the customer 10, the merchant 20 and the card acquirer 40 that the transaction notarization is completed (330, 331 and 332).

Then the card acquirer 40 certifies the payment to the merchant 20, while upon receipt of the certificate, the merchant 20 delivers the commodity to the customer 10, with the result that a transaction is realized between the customer 10 and the merchant 20.

Meanwhile, FIGS. 5 and 6 illustrate the constitutions of the electronic notarization documents which are encrypted between the customer and the notarizing organization, and between the merchant and the notarizing organization. As shown in FIGS. 5 and 6, the electronic notarization document encrypted between the customer 10 and the notarizing organization 60 and between the merchant 20 and the notarizing organization 60 includes: electronic notarization document zones 501 and 601 formed initially by the notarizing organization 60; digitally signed zones 502 and 602 signed by the notarizing organization 60 by using a private key of its own; digitally signed zones 503 and 603 signed by the customer 10 and the merchant 20 by using private keys of their own; and digitally signed zones 504 and 604 signed by forming a message digest of the electronic notarization document.

FIG. 7 is a flow chart showing the method for forming an electronic notarized document encrypted between the notarizing organization and the customer according to the present invention. The method for forming an electronic notarized document encrypted between the notarizing organization and the merchant according to the present invention is also same as that of FIG. 7.

Therefore, referring to FIG. 7, the method for forming an electronic notarized document will be described. However, the method for forming an electronic notarized document encrypted between the notarizing organization and the merchant according to the present invention will be skipped.

In order to form an encrypted and safe notarization document between the customer 10 and the notarizing organization 60, first the electronic notarization document #2 is digitally signed by the notarizing organization 60 by using the private key of its own (710). Then the digitally signed electronic document #2 is decoded to inspect the contents (720). Then the electronic notarization document digitally signed by the notarizing organization is digitally signed by private key of the customer 10 (#3)(730). Then the electronic notarization document #2 is compared with the electronic notarization document (740). Then the notarizing organization 60 digitally signs on the message digest *1 of the electronic notarization document (*2) (750). Then by utilizing the electronic document #3 and the message digest +2, an electronic notarization document is prepared to furnish it to the customer 10 (760). Then the customer 10 stores the received electronic notarization document.

This procedure will be described in further details.

First, the notarizing organization 60 prepares (711) an electronic notarization document #1 by utilizing the transaction information, the customer certificate, the merchant certificate, and the notarizing organization certificate and the certifying organization certificate. Then by using the RSA (Ronale Rivest, Adi Shamir and Leonard Adleman) encrypting module by using its own private key, an electronic notarization document #2 is formed (712) by digitally signing the electronic notarization document #1. Then the document #2 is transmitted to the customer 10 (713), and the customer 10 stores the received document #2 (721). Further, the document is decoded (723) by using the RSA encrypting module (722) and by using the private key of the notarizing organization 60. Then the decoded document is inspected (724).

Then the customer calls out (731) the document #2, and digitally signs on the document by using the RSA encrypting module with its own private key so as to form (732) a signed electronic notarization document #3. The document #3 is sent to the notarizing organization 60 (733).

Then the notarizing organization 60 stores (741) the document #3, and decodes the document #3 by using the RSA encrypting module with the open key of the customer 10 (742). Then the document #3 is decoded (743) by using the RSA encrypting module to form an electronic notarization document #4 (744). Then the document #4 is compared (745) with the document #1, and if the document #4 and the document #1 are identical with each other, then the document #1 is subjected to the SHA encrypting module (751) to form a message digest *1 (752). Then the private key of the notarizing organization 60 is applied to the RSA encrypting module (753) to form a digitally signed message digest *2 (754).

Then by utilizing the document #3 and the message digest *2, there is formed a final electronic notarization document (refer to FIG. 5) to prove the realization of the transaction notarization. Then this is sent to the customer 10 (760), and the customer 10 stores the received document (770).

In such an on-line electronic transaction, there are security threatening factors such as information exposure, information analysis, fraud, information content manipulation, information sequence altering, information retransmission, denial of reception of information and the like. Among these threatening factors, the information exposure and the information analysis are security problems, while the denial of the reception of the information is related to the digital signature. The information content altering is an intrusion into the information certification.

The information certification ensures that the information contents are not altered. The digital signing is a security technique for solving the problem of a denial of reception or transmission of information. Therefore, in order to meet the security requisites, there are required at minimum the information confidence, the information certification, and the digital signature. Along with these, a user certification is required to certify the customer and the merchant.

Therefore, in the present invention, in order to provide safe transaction notarizations, there is used an information encrypting technique. The information encrypting technique includes: the digital signature, the RSA module, the message digest technique, and the X509-based certification.

FIG. 8 is a flow chart showing the method for checking the encrypted electronic notarized document according to the present invention. Referring to FIG. 8, the method for checking the encrypted electronic notarized document according to the present invention is carried out in the following manner. The encrypted electronic notarization documents (refer to FIGS. 5 and 6) are separated (810). Thus they are separated into: message digest zones 504 and 604 signed by the private key of the notarizing organization; and digitally signed electronic notarization document zones 502, 503, 602 and 603 signed by the notarizing organization and the customer (or the merchant).

The message digest zones 504 and 604 are decoded (822) by using the RSA module with the open key of the customer. Thus a decoded message digest @1 is obtained (823). The zones 502, 503, 602 and 603 are decoded (832) by using the RSA module with the open key of the customer. Then they are decodes (833) by using the RSA module with the open key of the notarizing organization to form a decoded electronic notarization document (834). Then the document thus decoded is encrypted (835) by using the SHA module to form a message digest &1 (836).

The two message digests @1 and &1 are compared with each other (840), and if their values are identical, then the notarization document checking and confirming procedures are terminated (850).

According to the present invention as described above, an electronic notarization document ensuring the authenticity of the transaction documents can be provided. Particularly, the open key encrypting method and the message digest are used, so that certification and non-defectiveness would be ensured. Therefore, the authenticity of the transaction documents is ensured, particularly through the use of the digital signature. Thus the denial of the reception and transmission of the transaction contents can be prevented, thereby ensuring the safety of transactions.

What is claimed is:

1. A method for preparing safe electronic notarized document in electronic commerce, comprising the steps of:

a first step of preparing a primary electronic notarized document based on a transaction detail information, a customer certificate, a merchant certificate, a notarizing organization certificate, and a certifying organization certificate by a notarizing organization, putting a digital signature to the primary notarized document by using a private key of said notarizing organization so as to form a secondary electronic notarized document, and transmitting the secondary electronic notarized document to a customer or a merchant a second step of decoding the secondary electronic notarized document of the first step by said customer or merchant by using a private key of said notarizing organization;

a third step of putting a digital signature on the decoded secondary electronic notarized document of the second step by said customer or merchant by using a private key of his or her own so as to form a tertiary electronic notarized document, and transmitting the tertiary electronic notarized document to said notarizing organization;

a fourth step of decoding the tertiary electronic notarized document of the third step by using an open key of said notarizing organization and an open key of said customer or merchant so as to form a biquadratic electronic notarized document, and comparing the biquadratic electronic notarized document with the primary electronic notarized document of the first step;

a fifth step of obtaining a message digest of the notarized document upon finding a correspondence between the electronic notarized document of the first step and the electronic notarized document of the fourth step, and putting a digital signature on the message digest by using a private key of said notarizing organization;

a sixth step of forming a final electronic notarized document for providing a realization of notarization of the transaction by utilizing the digitally signed tertiary electronic notarized document of the third step and the digitally signed message digest of the fifth step, and sending the final electronic notarized document to said customer or merchant; and a seventh step of storing the final electronic notarized document of the sixth step by said customer or merchant after receipt of it from said notarizing organization.

2. The method as claimed in claim 1, wherein the electronic notarization document formed by said notarizing organization in said first step comprises:

an approved notary number field which stores an approved notary number assigned by said notarizing organization after an approval of the transaction between said customer and said merchant;

a payment method field which stores the payment method selected by said customer;

a transaction type field which expresses a kind of the transaction between said customer and said merchant;

a payment information field which stores a payment method information based on characteristics of a payment method;

a customer information field which stores a name of said customer;

a transaction sate field which stores a data and time of the transaction between said customer and said merchant;

a merchant information field which stores a name of a shopping mall of said merchant;

an installment information field which expresses installment information if said customer requested an installment payment;

an amount information field for storing a price of the commodity selected by said customer;

a tax information field which expresses a tax for the commodity selected by said customer;

a total amount field which expresses a total amount for the commodity consisting of the amount of the amount information field and the tax of the tax information field;

a customer certificate field which stores a certificate of said customer;

the merchant certificate field which stores a certificate of said merchant;

a notary authority certificate field which stores a certificate of said notarizing organization; and a certifying authority certificate field which stores a certificate of said certifying organization.

3. The method as claimed in claim 1, wherein a final electronic notarization document transmitted from said notarizing organization to said customer or said merchant in said sixth step comprises:

electronic notarization document zones formed initially by said notarizing organization;

digitally signed zone signed by said notarizing organization by using a private key thereof;

digitally signed zones signed by said customer and said merchant using private keys thereof; and digitally signed zones signed by forming a message digest of the electronic notarization document.

* * * * *